(12) United States Patent
Mandadi et al.

(10) Patent No.: US 12,121,028 B2
(45) Date of Patent: Oct. 22, 2024

(54) PLANT ANTIMICROBIAL COMPOSITIONS AND METHODS OF USE THEREOF

(71) Applicant: The Texas A&M University System, College Station, TX (US)

(72) Inventors: Kranthi Mandadi, Weslaco, TX (US); Manikandan Ramasamy, Weslaco, TX (US); Prakash Niraula, Weslaco, TX (US); Sonia Irigoyen, Weslaco, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 17/303,367

(22) Filed: May 27, 2021

(65) Prior Publication Data

US 2021/0368795 A1    Dec. 2, 2021

Related U.S. Application Data

(60) Provisional application No. 63/031,962, filed on May 29, 2020.

(51) Int. Cl.

| A01N 43/90 | (2006.01) |
|---|---|
| A01N 31/04 | (2006.01) |
| A01N 33/04 | (2006.01) |
| A01N 37/44 | (2006.01) |
| A01N 41/10 | (2006.01) |
| A01N 43/42 | (2006.01) |

(52) U.S. Cl.
CPC ............ *A01N 43/90* (2013.01); *A01N 31/04* (2013.01); *A01N 33/04* (2013.01); *A01N 37/44* (2013.01); *A01N 41/10* (2013.01); *A01N 43/42* (2013.01)

(58) Field of Classification Search
None
See application file for complete search history.

(56) References Cited

U.S. PATENT DOCUMENTS 2,720,727 A    10/1955    Pidacks

FOREIGN PATENT DOCUMENTS

| CN | 105773764 A | * | 7/2016 |
| CN | 110150304 A | | 8/2019 |
| JP | S5839602 A | | 3/1983 |
| JP | 2007000518 A | * | 1/2007 |
| RU | 2350077 C2 | * | 3/2009 |
| WO | 2014046636 A1 | | 3/2014 |

OTHER PUBLICATIONS

Munir et al., "Huanglongbing Control: Perhaps the End of the Beginning", Microb. Ecol., vol. 76, No. 1, pp. 192-204, Jul. 2018.
Puttamuk, et al., "Effect of chemical treatments on 'Candidatus Liberibacter asiaticus' infected pomelo (Citrus maxima)", Crop Protection, vol. 65, pp. 114-121, 2014.
Zhang et al., "Effective Antibiotics against 'Candidatus Liberibacter asiaticus' in HLB-Affected Citrus Plants Identified via the Graft-Based Evaluation", PLOS ONE, vol. 9, No. 11, e111032, doi: 10.1371/journal.pone.0111032, pp. 1-16, Nov. 5, 2014.
Zhang et al., "A Graft-Based Chemotherapy Method for Screening Effective Molecules and Rescuing Huanglongbing-Affected Citrus Plants", Phytopathology, vol. 102, No. 6, pp. 567-574, Jun. 2012.
Cinoxacin, Cas No. 28657-80-9, https://www.chemicalbook.com/ChemicalProductProperty_EN_CB3200706.htm, 7 pages, 1979.
Zhang et al., "Effective Antibiotics against 'Candidatus Liberibacter asiaticus' in HLB-Affected Citrus Plants Identified via the Graft-Based Evaluation", PLOS ONE, vol. 9, Issue 11, e111032, pp. 1-11, Nov. 2014.

* cited by examiner

*Primary Examiner* — Alton N Pryor
(74) *Attorney, Agent, or Firm* — McKee, Voorhees & Sease, PLC

(57) ABSTRACT

Applicants have developed novel methods and compositions for treating, preventing or ameliorating the effects plant phytopathogen infestation in plants, including of *Candidatus liberibacter* spp. the causal agents of citrus greening and potato zebrachip disease. Novel compositions include one or more active agents of aminocaproic acid, carbinoxamine maleate, chloroxylenol, chlorpropamide, cinoxacin, duartin, and cyclopentolate hydrochloride as well as their derivatives, or salt/acid forms thereof. Methods of preventing disease development and infestation by plant pathogens are disclosed as well as methods of making, using and producing such compositions.

33 Claims, 7 Drawing Sheets

PLANT ANTIMICROBIAL COMPOSITIONS AND METHODS OF USE THEREOF

CROSS REFERENCE TO RELATED APPLICATION

This application claims priority to provisional application U.S. Ser. No. 63/031,962, filed May 29, 2020, which is incorporated herein by reference in its entirety.

GRANT REFERENCE

This invention was made with government support under the Foundation for Food and Agriculture Research, Award No. 534299. The government has certain rights in the invention.

FIELD

The invention relates generally to the field of antimicrobial compositions to ameliorate diseases caused by bacterial and other plant pathogens, in particular, *Candidatus liberibacter* spp. Such as those responsible for diseases such as Potato Zebrachip and Citrus greening disease.

BACKGROUND

Hemipteran insects are devastating pests of crops due to their wide host range, rapid reproduction, and ability to transmit numerous plant-infecting phytopathogens as vectors. While the field of plant-virus-vector interactions has flourished in recent years, plant-bacteria-vector interactions remain poorly understood. Leafhoppers and psyllids are by far the most important vectors of bacterial pathogens, yet there are still significant gaps in our understanding of their feeding behavior, salivary secretions, and plant responses as compared to important viral vectors, such as whiteflies and aphids.

Hemipteran pests, such as whiteflies, aphids, psyllids, and leafhoppers have specialized mouthparts, known as stylets, allow hemipterans to penetrate the plant's epidermal tissues and reach their preferred tissue. Some hemipterans feed from the mesophyll and vascular system, while others only probe the mesophyll and feed exclusively from the phloem or xylem. As a result of this specialized feeding, hemipterans interact with microbes colonizing the plant vascular system and can serve as vectors for devastating plant viruses and bacteria.

For example, the bacteria '*Candidatus liberibacter* spp.' carried by hemipteran insects cause severe yield losses in the Solanaceae such as potato (*Solanum tuberosum* L.), tomato (*S. lycopersicum* L.), pepper (*Capsicum annuum* L.) and tobacco (*Nicotiana tabacum* L.) as well as Rutaceae (*Citrus* spp.) families. Potato zebra chip (ZC) disease, is also caused by '*Candidatus liberibacter solanacearum*' (CLso); its insect vector is the tomato potato psyllid (*Bactericera cockerelli* (Šulc); [Hemiptera: Triozidae]).

Since its discovery in 1994, ZC has been documented in several commercial potato-growing regions of the United States, Mexico, Central America, Australia and New Zealand, causing yield losses of up to 94%. Similarly, citrus greening or huanglongbing (HLB), putatively caused by '*Candidatus liberibacter asiaticus*' (CLas), *Candidatus liberibacter africanus*, or *Candidatus liberibacter americanus*, is the most devastating disease threatening citrus production worldwide; its insect vector is the Asian citrus psyllid (*Diaphorina citri kuwayama* [Hemiptera: Liviidae]).

Between 2006 and 2011, HLB caused losses of more than US$4.5 billion in the US state of Florida alone. CLas and CLso share some commonalities, such as their unculturable nature, genomic attributes and lifestyles as psyllid-vectored and phloem-limited bacteria. These and other diseases caused by fastidious plant pathogens are major threats to global agriculture and food security.

There is a long-felt need in the art for environmentally friendly and economical methods for reducing damage to food and commodity crops as well as ornamental plants from phytopathogens of *Candidatus liberibacter* spp, and resultant plant diseases.

SUMMARY

Applicants have developed novel methods and compositions for treating, preventing or ameliorating the effects of *Candidatus liberibacter* spp. infestation in plants. Further due the broad-spectrum activity of the chemicals it is expected that they these compounds will have activity in controlling other similar plant pathogens and diseases, such as gram negative and/or gram positive bacteria.

The causal agents of citrus greening and potato zebrachip disease are devastating to agriculture and caused by *Candidatus liberibacter* spp. Applicants have discovered several compounds that inhibit these as well as other bacterial plant pathogens, these include aminocaproic acid, carbinoxamine maleate, chloroxylenol, chlorpropamide, cinoxacin, duartin, and cyclopentolate hydrochloride as well as their derivatives, or salt/acid forms can be used to prevent, treat or ameliorate the effects of infestation. It is extremely unpredictable which compounds will inhibit and which will not. For example, applicants screened hundreds of compounds and only nine were found effective. The effective compounds are vastly different, as three of them are antibacterial, whereas others were classified as antifungal, antiprotozoal, hemostatic, antihistaminic, antidiabetic and mydriatic drugs targeting various biological processes.

The disclosure thus relates to compositions comprising one or more of these active agents in effective amounts combined with carriers, adjuvants, additional active components or other excipients. The compositions may be in any form for administration such as solid, pellet, or liquid form and are introduced to the plant such as by spraying, injection or incorporating into soil and the like.

Plants which may be treated are any that any that may be susceptible to any of the following plant pathogens, *Candidatus liberibacter* spp. *Xylella fastidiosa*, *Spiroplasma* spp., *liberibacter* spp., *Clavibacter* spp., *Pseudomonas syringae*, *Agrobacterium tumefaciens* or *Candidatus phytoplasma* spp. In certain embodiments plants which may be treated include those with are susceptible to *Candidatus liberibacter* spp including but not limited to Solanaceae plants such as potato, tomato, pepper, tobacco as well as *Citrus* spp. Also included are plants that are susceptible to or other Hemipteran and other plant pests, such the Asian citrus psyllid which carry phytopathogens such as *Candidatus liberibacter* spp. Other diseases include the Potato zebrachip (ZC) disease.

Methods of preventing disease development and infestation by plant pathogens such as, for example, *Candidatus liberibacter* are disclosed as well as applying the active agents to said plants or a field of said plants are disclosed as well as methods of making, using and producing such compositions. Plants treated with the compositions of the invention displayed a reduction of the disease symptoms of chlorosis, necrosis, leaf curling and wilting associated with infection with yeast and other plant pathogens including but not limited to *Candidatus liberibacter* spp.

Figure 1A:
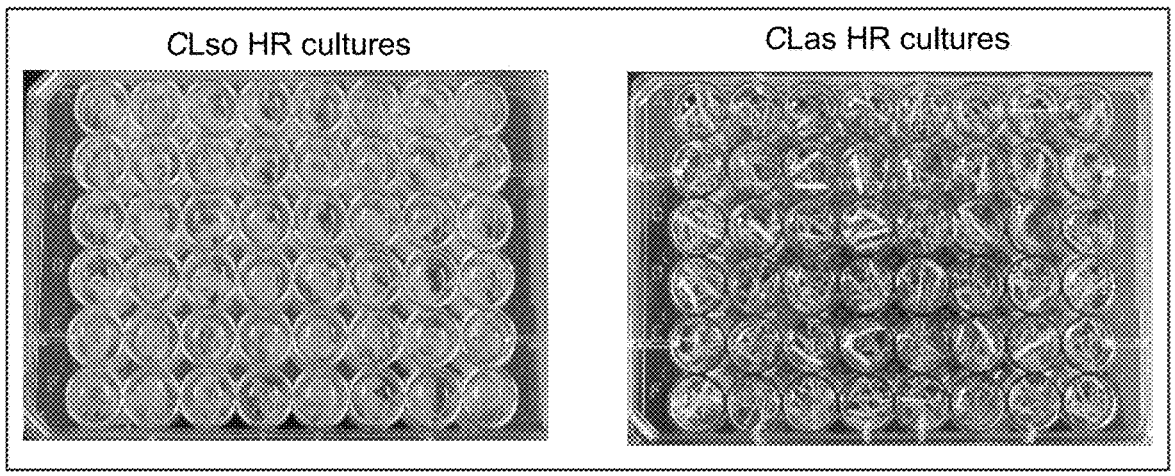
FIGS. 1A-1M. High throughput screening and identification of new small molecule therapies that confer tolerance to *Candidatus liberibacter* spp. (1A-1B) Multi-well microbial hairy root culture plates were designed to conduct high throughput screening of ~220 compounds. Efficacy data of selected nine compound hits were re-assayed at 10 μM and 25 μM in (1A, 1B) CLso and (1A, 1C) CLas hairy root cultures. Untreated (UT), and tetracycline (TC) at 250 and 500 ppm for CLso and CLas assays, were used as positive and negative controls, respectively. The bacterial titers were estimated by qPCR after 72 h treatment with the respective compounds and was plotted relative to untreated samples set to 100%. All assays were performed using five biological replicates; error bars represent standard error. (*, , Student's t test p≤0.05 and 0.01, respectively). Chemical structures of (1D) tetracycline and the nine hits were re-tested: (1E) aminocaproic acid (#1), (1F) carbinoxamine maleate (#2), (1G) chloroxylenol (#3), (1H) chlorpropamide (#4), (1I) chlortetracycline (#5), (1J) cinoxacin (#6), (1K) cortisone acetate (#7), (1L) duartin (#8), and (1**M) cyclopentolate hydrochloride (#9).

FIGS. 2A-2B. In planta application of small molecules by foliar spraying confer tolerance to *Candidatus liberibacter* spp. in potatoes (2A) Visual symptoms of plants at 28 days post infection (dpi). Tetracycline (TC, 250 ppm) and three selected small molecules (#3, #8 and #9, shown in FIG. 4) were sprayed at the respective concentrations (10 μM and 25 μM). Disease symptoms of chlorosis, necrosis, leaf curling and wilting were monitored. (2B) CLso titers were determined by qPCR at 28 dpi. All titers were plotted relative to untreated samples set to 100%. All assays were performed using four biological replicates; error bars represent standard error. (*, **, Student's t test p≤0.05 and 0.01, respectively). as estimated by qPCR on DNA extracted from leaves.

FIGS. 3A-3B. Dose-response inhibition assays of three selected compounds in CLso-potato and CLas-citrus hairy root cultures. Dose-response inhibition assays of three selected compounds in CLso-potato and CLas-citrus hairy root cultures. Relative CLas (3*a*) and CLso (3*b*) titers were calculated from five biological replicates. Untreated, DMSO (0.1%) and tetracycline (TC, 250 ppm) were used as negative and positive controls. Error bars represent standard error. *, **, Student's t-test P≤0.05 and 0.01, respectively.

FIG. 4. Dose-response inhibition assays of cinoxacin (#6) in CLas-citrus hairy root cultures. Relative CLas titers were calculated from five biological replicates. Untreated, DMSO (0.1%) and tetracycline (TC, 250 ppm) were used as negative and positive controls. Error bars represent standard error. **, Student's t-test P≤0.01.

DETAILED DESCRIPTION

The practice of the present invention will employ, unless otherwise indicated, conventional techniques of botany, microbiology, chemistry, and biochemistry, which are within the skill of the art. Such techniques are explained fully in the literature. See, e.g., Langenheim and Thimann, (1982) *Botany: Plant Biology and Its Relation to Human Affairs*, John Wiley; *Cell Culture and Somatic Cell Genetics of Plants*, vol. 1, Vasil, ed. (1984); Stanier, et al., (1986) *The Microbial World*, 5th ed., Prentice-Hall; Dhringra and Sinclair, (1985) *Basic Plant Pathology Methods*, CRC Press; Maniatis, et al., (1982) *Molecular Cloning: A Laboratory Manual; DNA Cloning*, vols. I and II, Glover, ed. (1985); *Oligonucleotide Synthesis*, Gait, ed. (1984); *Nucleic Acid Hybridization*, Hames and Higgins, eds. (1984); and the series *Methods in Enzymology*, Colowick and Kaplan, eds, Academic Press, Inc., San Diego, CA.

Units, prefixes, and symbols may be denoted in their SI accepted form. Unless otherwise indicated, nucleic acids are written left to right in 5' to 3' orientation; amino acid sequences are written left to right in amino to carboxy orientation, respectively. Numeric ranges are inclusive of the numbers defining the range. Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes. The terms defined below are more fully defined by reference to the specification as a whole.

In describing the present invention, the following terms will be employed, and are intended to be defined as indicated below.

As used herein, the term "plant" includes reference to whole plants, plant organs (e.g., leaves, stems, roots, etc.), seeds and plant cells and progeny of same. Plant cell, as used herein includes, without limitation, cells in or from seeds, suspension cultures, embryos, meristematic regions, callus tissue, leaves, roots, shoots, gametophytes, sporophytes, pollen, and microspores. The class of plants which can be used in the methods of the invention is generally as broad as the class of higher plants amenable to transformation techniques, including both monocotyledonous and dicotyledonous plants including species from the genera: *Cucurbita, Rosa, Vitis, Juglans, Fragaria, Lotus, Medicago, Onobrychis, Trifolium, Trigonella, Vigna, Citrus, Linum, Geranium, Manihot, Daucus, Arabidopsis, Brassica, Raphanus, Sinapis, Atropa, Capsicum, Datura, Hyoscyamus, Lycopersicon, Nicotiana, Solanum, Petunia, Digitalis, Majorana, Ciahorium, Helianthus, Lactuca, Bromus, Asparagus, Antirrhinum, Heterocallis, Nemesis, Pelargonium, Panieum, Pennisetum, Ranunculus, Senecio, Salpiglossis, Cucumis, Browaalia, Glycine, Pisum, Phaseolus, Lolium, Oryza, Avena, Hordeum, Secale, Allium*, and *Triticum*.

"Crop plants" and "agricultural plants" are those of economic importance for human or animal food production or for animal fodder production and can include grains, fruits and vegetables as well as grasses. Horticultural plants include those for turfgrass, windbreaks and landscaping and include ornamental plants such as flowers, shrubs, vines and the like.

As used herein, "weight percent," "wt. %," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt.-%," etc.

As used herein, the term "about" refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture.

Whether or not modified by the term "about", the claims include equivalents to the quantities.
Figure 1B:
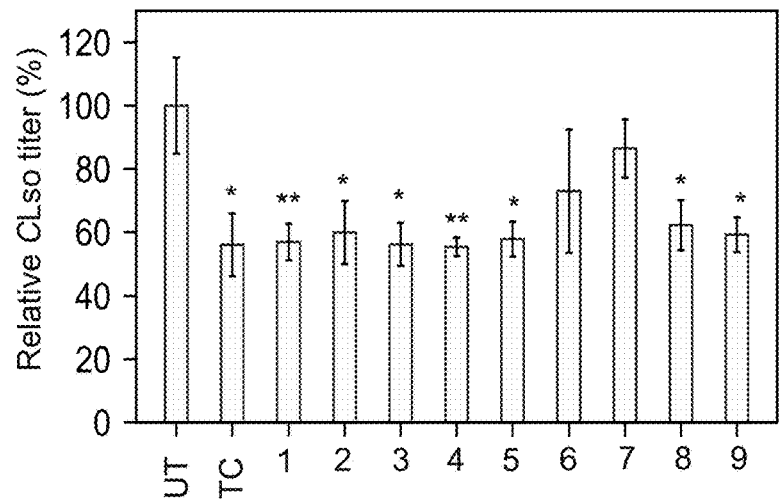
Figure 1C:
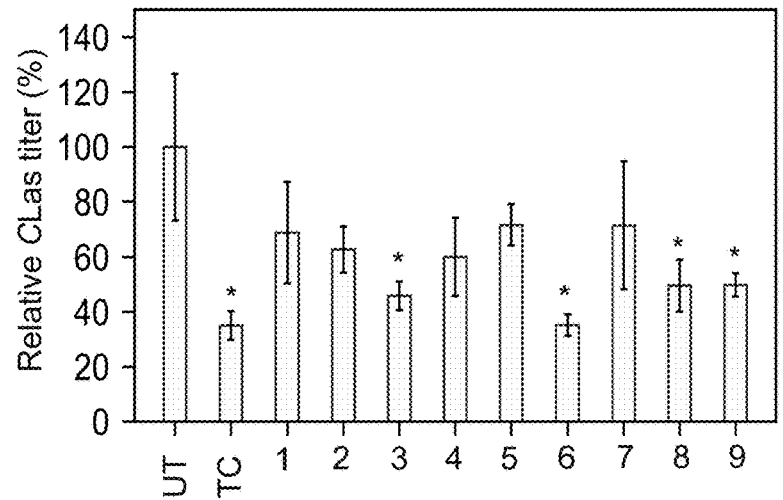
Figure 1D:
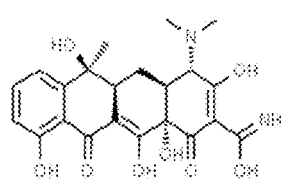
Figure 1E:
Figure 1F:
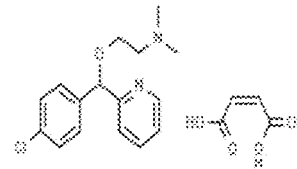
Figure 1G:
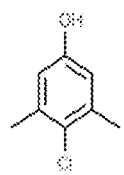
Figure 1H:
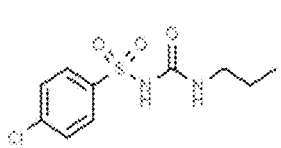
Figure 1I:
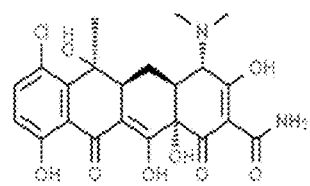
Figure 1J:
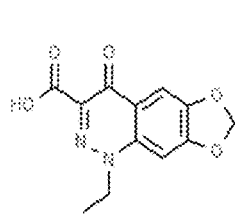
Figure 1K:
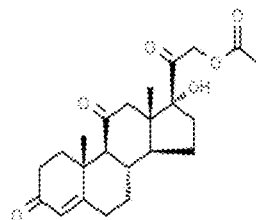
Figure 1L:
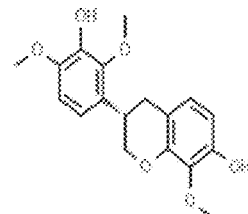
Figure 1M:
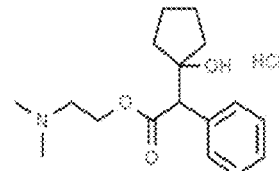
Figure 2A:
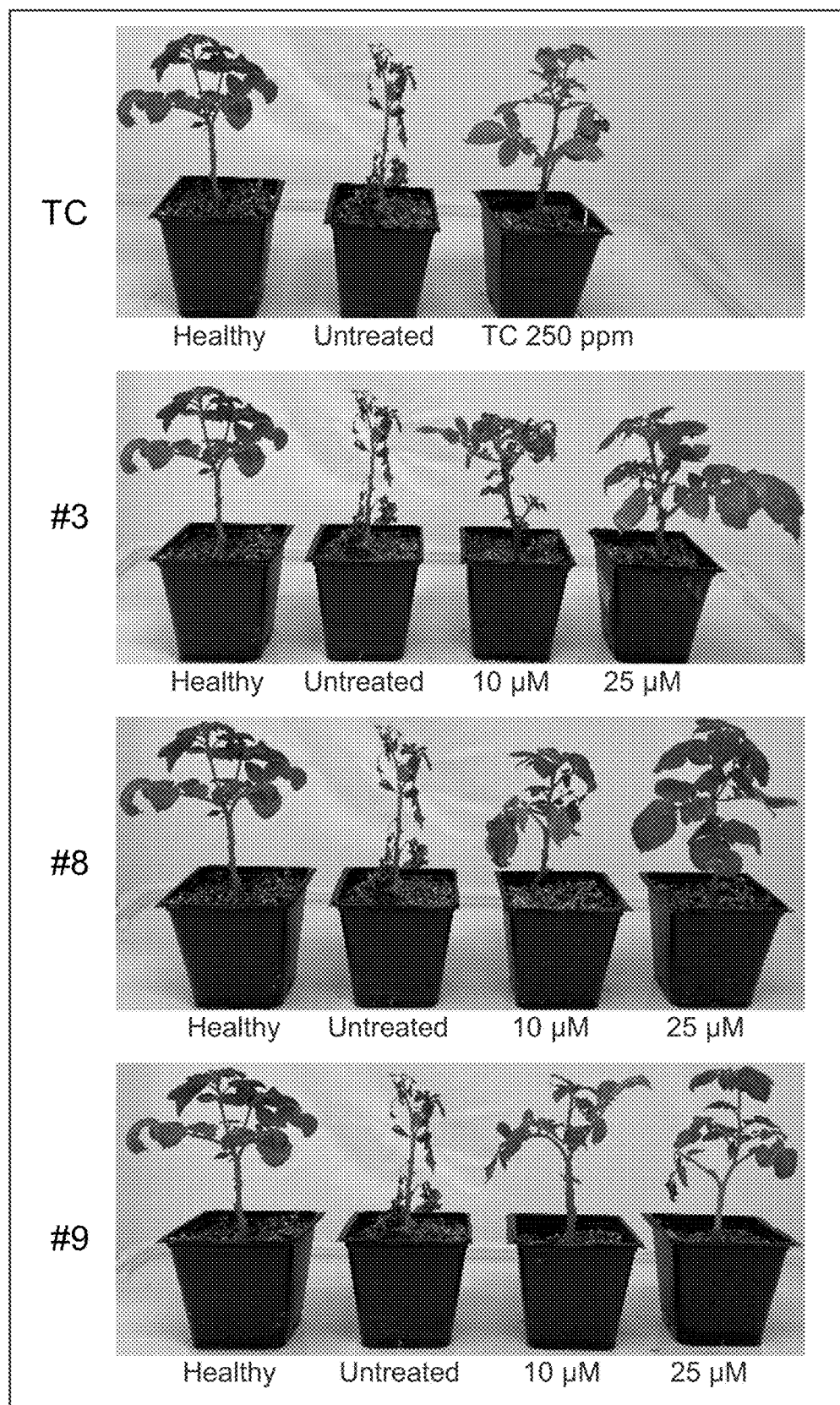
Figure 2B:
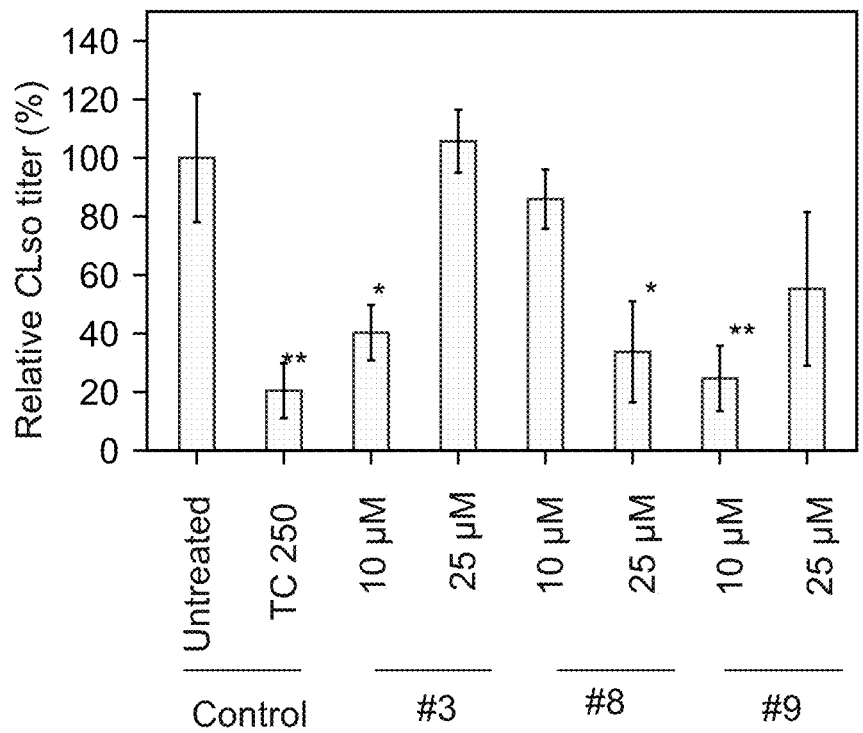

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

As used herein, the term "solid" refers to a composition or material in a solid state. Solids can include powders, pastes, prills, beads or flakes.

Unless stereochemistry is specifically indicated, all stereoisomers of the compounds herein are included, as pure compounds as well as mixtures thereof.

It will be appreciated by one of ordinary skill in the art that asymmetric centers may exist in any of the compounds described herein. Thus, the compounds may be in the form of an individual enantiomer, diastereomer, or geometric isomer, or may be in the form of a mixture of stereoisomers. In certain embodiments, the compounds are enantiopure compounds. In certain other embodiments, mixtures of stereoisomers or diastereomers are provided. Additionally, the compounds encompass both (Z) and (E) double bond isomers (or cis and trans isomers) unless otherwise specifically designated. Thus, compounds generally depicted in structures herein encompass those structures in which double bonds are (Z) or (E).

It will be appreciated that any compound described herein may be substituted with any number of substituents or functional moieties. In general, the term "substituted" whether preceded by the term "optionally" or not, and substituents contained in formulas, refer to the replacement of hydrogen atoms in a given structure with a specified substituent. When more than one position in any given structure may be substituted with more than one substituent selected from a specified group, the substituent may be either the same or different at every position.

As used herein, the term "substituted" includes all permissible substituents of organic compounds. In a broad aspect, the permissible substituents include acyclic and cyclic, branched and unbranched, carbocyclic and heterocyclic, aromatic and nonaromatic substituents of organic compounds. For purposes of explanation, heteroatoms such as nitrogen may have hydrogen substituents and/or any permissible substituents of organic compounds described herein which satisfy the valencies of the heteroatoms. Furthermore, there is not any intention to be limited in any manner by the permissible substituents of organic compounds. Combinations of substituents and variables envisioned are preferably those that result in the formation of stable compounds useful in the inhibition of growth of various plant pathogens such as fungus or fungus-like microorganisms.

Agents Active Against Plant Bacterial Pathogens

Applicants have discovered that aminocaproic acid, carbinoxamine maleate, chloroxylenol, chlorpropamide, cinoxacin, duartin, and cyclopentolate hydrochloride as well as their derivatives, or salt/acid forms can be used to prevent, treat or ameliorate the effects of infestation by phytopathogens. In addition to *Candidatus liberibacter* spp. Several of these compounds were shown to have activity against other plant pathogens. For example Chloroxylenol, and Chlorpropamide, and were shown to be effective against the gram-positive plant phytobacteria *Clavibacter michiganensis* (responsible for canker disease, ring rot and other xylem assaults). All were shown to be effective albeit at various concentrations against the gram-negative bacteria *Pseudomonas syringae* (responsible for necrosis of stems and leaves of plants). Finally chloroxylenol, Chlorpropamide, and Cinoxacin were shown to be effective against the gram-negative bacterial *Agrobacterium tumefaciens* (responsible for crawn gall disease). It is extremely unpredictable which compounds will inhibit and which will not. For example, applicants screened hundreds of compounds and only nine were found effective. The effective compounds are vastly different, as three of them are antibacterial, whereas others were classified as antifungal, antiprotozoal, hemostatic, antihistaminic, antidiabetic and mydriatic drugs targeting various biological processes. According to the invention, one or more of the following compounds may be used in methods or compositions disclosed herein.

Aminocaproic Acid Hydrochloride

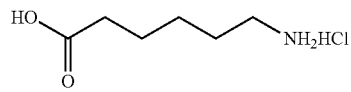

Aminocaproic acid, 6-aminohexanoic acid, acts as an inhibitor of fibrinolysis. It is a derivative and analogue of the amino acid lysine, which makes it an effective inhibitor for enzymes that bind that residue. Such enzymes include proteolytic enzymes like plasmin, the enzyme responsible for fibrinolysis. It is marketed as Amicar. Aminocaproic acid is also an intermediate in the polymerization of Nylon-6, where it is formed by ring-opening hydrolysis of caprolactam. The crystal structure determination showed that the 6-aminohexanoic acid is present as an ylide, at least in the solid state. It is soluble in water, acid, and alkaline solutions; it is sparingly soluble in methanol and practically insoluble in chloroform.

Carbinoxamine Maleate

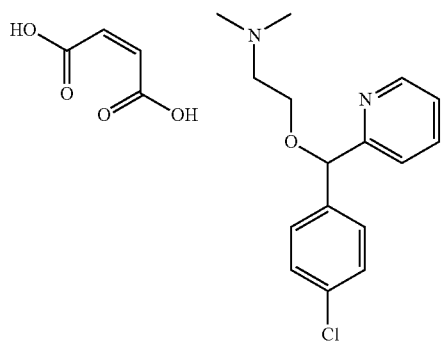 [SMILES: O=C(O)/C=C\C(=O)O ; CN(C)CCOC(c1ccc(Cl)cc1)c1ccccn1]

Carbinoxamine is an antihistamine and anticholinergic agent. It is used for hay fever, vasomotor rhinitis, mild urticaria, angioedema, dermatographism and allergic conjunctivitis. Carbinoxamine is a histamine antagonist, specifically an H1-antagonist. The maleic acid salt of the levorotatory isomer is sold as the prescription drug rotoxamine. chloroxylenol, Chloroxylenol

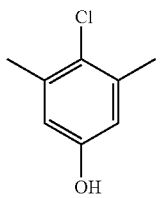

Chloroxylenol (4-chloro-3,5-dimethylphenol) is a chemical compound with the formula $C_8H_9ClO$ and CAS number 88-04-0. It is commonly used in antibacterial soaps such as Dettol; in agar patch studies, it has been found to kill a wide variety of microbes, including bacteria, fungi, and the superbug MRSA, within 15 seconds. Its antibacterial action is due to disruption of cell membrane potentials, blocking production of adenosine triphosphate (effectively starving the cells)

Chlorpropamide

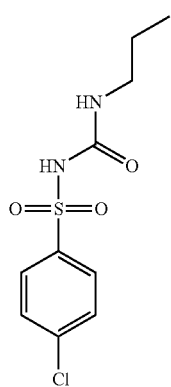 [SMILES: CCCNC(=O)NS(=O)(=O)c1ccc(Cl)cc1]

Chlorpropamide is an oral antihyperglycemic agent used for the treatment of non-insulin-dependent diabetes mellitus (NIDDM). It belongs to the sulfonylurea class of insulin secretagogues, which act by stimulating β cells of the pancreas to release insulin. Chlorpropamide is used along with diet and exercise, and sometimes with other medications, to treat type 2 diabetes (condition in which the body does not use insulin normally and, therefore, cannot control the amount of sugar in the blood). Chlorpropamide is in a class of medications called sulfonylureas. Chlorpropamide lowers blood sugar by causing the pancreas to produce insulin (a natural substance that is needed to break down sugar in the body) and helping the body use insulin efficiently. This medication will only help lower blood sugar in people whose bodies produce insulin naturally. Chlorpropamide is not used to treat type 1 diabetes (condition in which the body does not produce insulin and, therefore, cannot control the amount of sugar in the blood) or diabetic ketoacidosis (a serious condition that may occur if high blood sugar is not treated).

Cinoxacin

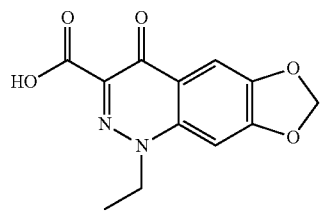 [SMILES: CCn1nc(C(=O)O)c(=O)c2cc3c(cc21)OCO3]

Cinoxacin, quinolone, is 1-ethyl-1,4-dihydro-4-oxo-[1,3] dioxolo [4,5-g] cinnoline-3-carboxylic acid and occurs as white or very light-yellow, needle-shaped crystals Cinoxacin is a member of the class of cinnolines that is 6,7-methylenedioxycinnolin-4(1H)-one bearing an ethyl group at position 1 and a carboxylic acid group at position 3. It is analogue of oxolinic acid, it has similar antibacterial actions. It was formerly used for the treatment of urinary tract infections. It has a role as an antibacterial drug and an antiinfective agent. It is a member of cinnolines, an oxo carboxylic acid and an oxacycle.

Duartin (−)

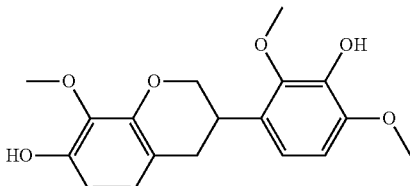

$C_{18}H_{20}O_6$ isoflavan (−)-duartin, from the heartwood of *Machaerium opacu*.

Cyclopentolate Hydrochloride

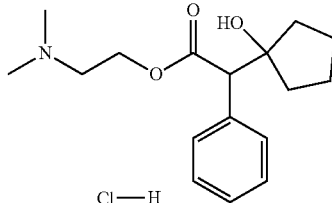

Cyclopentolate is a muscarinic antagonist. It is commonly used as an eye drop during pediatric eye examinations to dilate the eye (mydriatic) and prevent the eye from focusing/accommodating (cycloplegic). Cyclopentolate or atropine can also be administered to reverse muscarinic and central nervous system effects of indirect cholinomimetic (anti-AChase) administration. Cyclopentolate was first synthesized in as a chemical analogue of atropine. It was one of several derivatives of an analogue to tropic acid which were tested for pharmacological action in a search for new and better antisposmodic agents.

It is extremely unpredictable which compounds will inhibit and which will not. For example, applicants screened hundreds of compounds and only nine were found effective. The effective compounds are vastly different, as three of them are antibacterial, whereas others were classified as antifungal, antiprotozoal, hemostatic, antihistaminic, antidiabetic and mydriatic drugs targeting various biological processes. See Table A for a list of chemicals tested with similar bioactivities to those which were found to successfully inhibit *Candidatus liberibacter solanacearum* but did not show activity against the same.

TABLE A

Chemicals indexed with similar bioactivities but did not show activity against *Candidatus Liberibacter solanacearum*.

| Bioactivity | Chemical name |
|---|---|
| hemostatic | N/A |
| antihistaminic | DOXYLAMINE SUCCINATE |
| antibacterial | CEFOXITIN SODIUM |
|  | CEFUROXIME SODIUM |
|  | CEFAMANDOLE SODIUM |
|  | CEFMETAZOLE SODIUM |
|  | CEFAMANDOLE NAFATE |
|  | CLINDAMYCIN HYDROCHLORIDE |
|  | CYCLOSERINE (D) |
|  | DAPSONE |
|  | DEMECLOCYCLINE HYDROCHLORIDE |
|  | DICLOXACILLIN SODIUM |
|  | DOXYCYCLINE HYDROCHLORIDE |
|  | ERYTHROMYCIN ETHYLSUCCINATE |
|  | ERYTHROMYCIN ESTOLATE |
|  | ERYTHROMYCIN |
|  | FOSFOMYCIN CALCIUM |
|  | METHACYCLINE HYDROCHLORIDE |
|  | PHTHALYLSULFATHIAZOLE |
|  | SUCCINYLSULFATHIAZOLE |
|  | SULFADIMETHOXINE |
|  | SULFAQUINOXALINE SODIUM |
|  | SULFAMONOMETHOXINE |
|  | SULFAMETER |
|  | SULFAMETHOXYPYRIDAZINE |
| antidiabetic | DAPAGLIFLOZIN |
|  | ROSIGLITAZONE MALEATE |
|  | TOLAZAMIDE |
| antibacterial, antiamebic, Ca chelator, hepatotoxic; inhibits protein synthesis | see above for antibacterial |
| antibacterial | see above for antibacterial |
| antiprotozoal | PUROMYCIN DIHYDROCHLORIDE |
|  | RONIDAZOLE |
|  | SURAMIN HEXASODIUM |
|  | TINIDAZOLE |
| mydriatic | N/A |

Antimicrobial Compositions

A composition for controlling plant pathogens infestation and resultant diseases of contain at least one active selected from the group of aminocaproic acid, carbinoxamine maleate, chloroxylenol, chlorpropamide, cinoxacin, duartin, and cyclopentolate hydrochloride as well as their derivatives, or alternate salt/acid forms. The composition is used for controlling or preventing at least one disease caused by *Candidatus liberibacter* spp such as citrus greening and potato zebrachip disease.

The compositions for controlling/preventing plant diseases of the present invention can be produced according to the standard methods. That is, in the process for producing the composition for controlling plant diseases, active ingredients are independently used. Respectively, other active ingredients may be added to the composition containing one active ingredient and the composition containing at least one active ingredient may be produced. The composition for controlling plant diseases of the present disclosure can be produced by mixing a carrier and the composition described above. If necessary, by further adding adjuvants such as a surfactant, a wetting agent, an adhesive agent, a thickener, an antimicrobial antifungal agent, a coloring agent, or a stabilizer, it is possible to formulate into, for example, granules, wettable powders, flowable formulation, granulated wettable powders, dust, emulsifiable concentrates and the like in accordance with the usual methods.

An amount of the active ingredient in the composition for controlling plant diseases of the present invention is usually in the range of 0.005 to 99% by weight, preferably in the range of 0.1 to 90%, and more preferably 0.3 to 80%.

The content of the active ingredient in the composition for controlling plant diseases of the present invention is appropriately determined depending on the kind of formulation. In general, a dust contains the active ingredient in the range of 0.01 to 30% by weight. A wettable powder contains it in the range of 0.1 to 80% by weight. A granule contains it in the range of 0.5 to 25% by weight. An emulsifiable concentrate contains it in the range of 2 to 50% by weight. A flowable formulation contains it in the range of 1 to 50% by weight; and a dry flowable formulation contains it in the range of 1 to 80% by weight.

In the composition the preferred content of the active ingredient is 0.05 to 10% by weight in the dust, 5 to 60% by weight in the wettable powder, 2 to 15% by weight in the granule, 5 to 50% by weight in the emulsifiable concentrate, 5 to 50% by weight in the flowable formulation and 5 to 60% by weight in the dry flowable formulation.

The carrier used in the above composition includes a synthetic or natural inorganic or organic substance blended to facilitate an access of the active ingredient to a site to be treated and to facilitate storage, transport and handling of the active ingredient. The carrier can be used in either a solid form or a liquid form as long as it is usually used in the composition for controlling plant diseases, and therefore is not limited to a specific form.

Specific examples of the solid carrier include inorganic substances such as bentonite, montmorillonite, kaolinite, diatomaceous earth, white earth, talc, clay, vermiculite, gypsum, calcium carbonate, amorphous silica and ammonium sulfate; vegetable organic materials such as soybean flour, wood flour, saw dust, wheat flour, glucose, lactose and sucrose; urea and the like.

Specific examples of the liquid carrier include aromatic hydrocarbons such as toluene, xylene and cumene and naphthenes; paraffin hydrocarbons such as n-paraffin, iso-paraffin, liquid paraffin, kerosene, mineral oil and poly-butene; ketones such as acetone and methyl ethyl ketone; ethers such as dioxane and diethylene glycol dimethyl ether; alcohols such as ethanol, propanol and ethylene glycol; carbonates such as ethylene carbonate, propylene carbonate and butylene carbonate; aprotic solvent such as dimethyl-formamide and dimethyl sulfoxide; water and the like.

In addition, in order to enhance the efficacy of the active ingredient in the composition of the present invention, the adjuvants can be used alone or in combination depending on the purpose, in consideration of a kind of the formulation, the treatment method and the like. Examples of the adjuvant include a surfactant, a binder, a disintegrator, a stabilizer, a pH adjuster, an antimicrobial antifungal agent, a thickener, an antifoaming agent, an antifreezing agent and the like.

In general, examples of surfactants, which are used for purpose of emulsification, dispersion, spreading, and/or wetting of the composition for controlling plant diseases, include nonionic surfactants such as sorbitan fatty acid esters, polyoxyethylene sorbitan fatty acid esters, sucrose fatty acid esters, polyoxyethylene fatty acid esters, polyoxyethylene resin acid esters, polyoxyethylene fatty acid diesters, polyoxyethylene castor oil, polyoxyethylene alkyl ethers, polyoxyethylene alkyl phenyl esters, polyoxyethylene dialkyl phenyl ethers, formalin condensates of polyoxyethylene alkyl phenyl ethers, polyoxyethylene-polyoxypropylene block polymers, alkyl polyoxyethylene-polyoxypropylene block polymer ethers, alkyl phenyl polyoxyethylene-polyoxypropylene block polymer ethers, polyoxyethylene alkylamines, polyoxyethylene fatty acid amides, polyoxyethylene bisphenyl ethers, polyoxyalkylene benzyl phenyl ethers, polyoxyalkylene styryl phenyl ethers, higher-alcohol polyoxyalkylene adduct, polyoxyethylene ether, ester-type silicon surfactants and fluorine surfactants; anionic surfactants such as alkyl sulfates, polyoxyethylene alkyl ether sulfates, polyoxyethylene alkyl phenyl ether sulfates, polyoxyethylene benzyl phenyl ether sulfates, polyoxyethylene styryl phenyl ether sulfates, polyoxyethylene polyoxypropylene block polymer sulfates, paraffin sulfonates, alkane sulfonates, AOS, dialkyl sulfosuccinates, alkylbenzene sulfonates, naphthalene sulfonates, dialkyl naphthalene sulfonates, formalin condensates of naphthalene sulfonates, alkyl diphenyl ether disulfonates, lignin sulfonates, polyoxyethylene alkyl phenyl ether sulfonates, polyoxyethylene alkyl ether sulfosuccinic acid half esters, fatty acid salts, N-methyl-fatty acid sarcosinates, resin acid salts, polyoxyethylene alkyl ether phosphates, polyoxyethylene phenyl ether phosphates, polyoxyethylene dialkyl phenyl ether phosphates, polyoxyethylene benzylphenyl ether phosphates, polyoxyethylene benzylphenyl phenyl ether phosphates, polyoxyethylene styrylphenyl ether phosphates, polyoxyethylene styrylphenyl phenyl ether phosphates, polyoxyethylene polyoxypropylene block polymer phosphates, phosphatidylcholine, phosphatidyl ethanol imine, alkyl phosphates and sodium tripolyphosphate; polyanionic polymer surfactants derived from acrylic acid, acrylonitrile and acrylamidomethyl propanesulfonic acid; cationic surfactants such as alkyltrimethylammonium chloride, methyl polyoxyethylene alkylammonium chloride, alkyl N-methylpyridinium bromide, monomethylammonium chloride, dialkylmethylammonium chloride, alkylpentamethylpropyleneamine dichloride, alkyldimethylbenzalkonium chloride and benzethonium chloride; ampholytic surfactants such as dialkyldiaminoethyl betain and alkyldimethylbenzyl betain and the like.

Examples of the wetting agent include polyoxyethylene alkyl phenyl ether, sodium alkylbenzenesulfonate, dioctyl sulfosuccinate, sodium alkylnaphthalene sulphonate, sodium alkylsulfate, sodium alkylnaphthalene sulphonate, sodium alkylsulfate, sodium alkylbenzenesulfonate, alkyl sodium sulfosuccinate, polyoxyethylene alkyl allyl ether, sodium alkylnaphthalenesulfonate, polyoxyethylene nonylphenyl ether and the like. Examples of the adhesive agent include polyacrylate, polyoxyethylene, wax, polyvinyl alkyl ether, a formalin condensate of alkyl phenol, phosphate ester of starch, synthetic resin emulsion, starches, resin powder, a water-swellable polymer substance, paraffin and the like.

Examples of the binder include sodium alginate, polyvinyl alcohol, gum arabic, CMC sodium or bentonite and the like.

Examples of the disintegrator include CMC sodium, croscarmellose sodium and the like and examples of the stabilizer include a hindered phenol-based antioxidant, and a benzotriazole-based and a hindered amine-based ultraviolet absorbers and the like.

Examples of the pH adjuster include phosphoric acid, acetic acid, sodium hydroxide and the like and examples of the antimicrobial antifungal agent include industrial fungicides such as 1,2-benzoisothiazolin-3-one.

Examples of the thickener include xanthan gum, guar gum, sodium CMC, gum arabic, polyvinyl alcohol, montmorillonite and the like, examples of the antifoaming agent include silicone-based compounds and the like, and examples of the antifreezing agent include propylene glycol, ethylene glycol and the like. However, these adjuvants are not limited to the above.

Additional Actives

The compositions of the disclosure can be mixed with, other agricultural chemicals such as an insecticide, miticide, nematicide, fungicide, herbicide, a plant growth regulator, microbial agricultural chemical, soil conditioner and/or fertilizer, and can be a mixed formulation therewith.

Specific examples of the fungicide, the insecticide, the miticide and the nematicide include allethrin, tetramethrin, resmethrin, phenothrin, furamethrin, permethrin, cypermethrin, deltamethrin, cyhalothrin, cyfluthrin, fenpropathrin, tralomethrin, cycloprothrin, flucythrinate, fluvalinate, acrinathrin, tefluthrin, bifenthrin, empenthrin, betacyfluthrin, cypermethrin, fenvalerate, esfenvalerate, flubrocythrinate, metofluthrin, profluthrin, dimefluthrin, flubrocythrinate, silafluofen, pyrethrum extract, etofenprox, halphenprox, DDVP, cyanophos, fenthion, fenitrothion, tetrachlorvinphos, dimethylvinphos, propaphos, methyl parathion, temephos, phoxim, acephate, isofenphos, salithion, DEP, EPN, ethion, mecarbam, pyridafenthion, diazinon, pirimiphos-methyl, etrimfos, isoxathion, quinalphos, chlorpyrifos-methyl, chlorpyrifos, phosalone, phosmet, methidathion, oxydeprofos, vamidothion, malathion, phenthoate, dimethoate, formothion, thiometon, disulfoton, phorate, terbufos, profenofos, prothiofos, sulprofos, pyraclofos, monocrotophos, naled, fosthiazate, trichlorfon, ethoprophos, cadusafos, clofenvinfos, dichlofenthion, ethylthiometon, methamidophos, dichlorvos, tebupirimfos, omethoate, triazophos, oxydemeton-methyl, azinphos-methyl, chlorethoxyfos, dicrotophos, disulfoton, fenamiphos, phosphamidon, trichlorfon, chlormephos, demeton-S-methyl, mevinphos, parathion, tebupirimfos, MEP, malathion, DCIP, MPP, NAC, MTMC, MIPC, BPMC, XMC, PHC, MPMC, ethiofencarb, bendiocarb, pirimicarb, carbosulfan, benfuracarb, methomyl, oxamyl, aldicarb, thiodicarb, alanycarb, carbofuran, methiocarb, fenothiocarb, formetanate, xylyl methylcarbamate, propoxur, isoprocarb, furathiocarb, imidacloprid, nitenpyram, acetamiprid, dinotefuran, thiamethoxam, thiacloprid, clothianidin, bromopropylate, dicofol, endosulfan, lindane, diflubenzuron, chlorfluazuron, teflubenzuron, triflumuron, flufenoxuron, flucycloxuron, hexaflumuron, fluazuron, diafenthiuron, novaluron, noviflumuron, bistrifluron, chromafenozide, halofenozide, methoxyfenozide, lufenuron, cyromazine, triazamate, tebufenozide, buprofezin, isoprothiolane, nicotine sulfate, polynactin complex, abamectin, milbemectin, lepimectin, BT agent, spinosad, rotenone, cartap, thiocyclam, bensultap, thifluzamide, flutolanil, mepronil, pencycuron, ethaboxam, oxycarboxin, carboxin, silthiofam, carpropamid, diclocymet, fenoxanil, azoxystrobin, metominostrobin, orysastrobin, kresoxim-methyl, fluoxastrobin, trifloxystrobin, dimoxystrobin, pyraclostrobin, picoxystrobin, kasugamycin, validamycin, blasticiden-S-benzylaminobenzenesulfonate, polyoxin, tecloftalam, oxytetracycline, streptomycin, blasticidin S, mildiomycin, polyoxins, ferimzone, fenarimol, pyrifenox, nuarimol, bupirimate, simeconazole, furametpyr, ipconazole, triflumizol, prochloraz, pefurazoate, imazalil, imibenconazole, etridiazol, epoxiconazole, oxpoconazole-fumarate, diniconazole, difenoconazole, cyproconazole, tetraconazole, tebuconazole, triadimenol, triadimefon, triticonazole, bitertanol, hymexazol, fenbuconazole, fluquinconazole, flusilazole, flutriafol, prothioconazole, propiconazole, bromuconazole, hexaconazole, penconazole, metconazole, copper, copper nonylphenol sulfonate, copper oxychloride, basic copper sulphate, oxine-copper, DBEDC, anhydrous copper sulfate, copper dihydroxide, thiophanate-methyl, benomyl, thiabendazole, thiophanate, carbendazim, fuberidazole, EDDP, IBP, tolclofos-methyl, fosetyl, dinocap, pyrazophos, metalaxyl, oxadixyl, benalaxyl, metalaxyl M, iprodione, procymidone, vinclozolin, chlozolinate, thiram, mancozeb, propineb, zineb, metiram, maneb, ziram, amobam, hydroxyisoxazole, methasulfocarb, chloropicrin, flusulfamide, dazomet, methyl isothiocyanate, hydroisoxazole-potassium, echlomezol, 1,3-dichloropropene, TPN, captan, mepanipyrim, cyprodinil, pyrimethanil, rapeseed oil, machine oil, sulfur, lime sulfur, zinc sulfate, fentin, sodium hydrogen carbonate, potassium hydrogen carbonate, hypochlorite, dimethomorph, fenpropidin, fenpropimorph, spiroxamine, tridemorph, dodemorph, flumorph, chlorobenzilate, phenisobromolate, tetradifon, CPCBS, BPPS, chinomethionate, amitraz, benzomate, hexythiazox, fenbutatin oxide, cyhexatin, dienochlor, clofentezine, pyridaben, fenpyroximate, fenazaquin, tebufenpyrad, pyrimidifen, acequinocyl, bifenazate, etoxazole, spirodiclofen, spiromesifen, amidoflumet, diflovidazin, kelthane, pymetrozine, fipronil, fenoxycarb, pyriproxyfen, methoprene, hydroplane, kinoprene, endosulfan, triathlon, benzoepin, emamectin benzoate, emamectin benzoate, flupyrazofos, fluacrypyrim, fluphenazine, indoxacarb, tolfenpyrad, gamma-cyhalothrin, ethiprole, acetoprole, amidoflumet, chlorfenapyr, flonicamid, flufenerim, pyridalyl, sodium oleate, potassium oleate, azadirachtin, carbam, carbam sodium, propargite, azocyclotin, benzoximate, metaldehyde, protrifenbute, benclothiaz, flubendiamide, metaflumizone, nicotine sulfate, lime nitrogen, machine oil, bensultap, flubendiamide, chlorantraniliprole, cyantraniliprole, pyrifluquinazon, metaflumizone, oxolinic acid, pseudomonas CAB-02, tricoderma atroviride, fludioxonil, DPC, 4-[3-(3,4-dimethoxyphenyl)-3-(4-fluorophenyl)acryloyl]morpholine, anilazine, iprovalicarb, imazalil, iminoctadine albesilate, quinoxyfen, chinomethionate, metal silver, quintozene, guazatine, chlorothalonil, chloroneb, cyazofamid, diethofencarb, dichlofluanid, dichloran, dithianon, diflumetorim, dimethirimol, cymoxanil, silthiofam, spiroxamine, zoxamide, thiadiazin, dodine, triforine, tolylfluanid, nitrothal-isopropyl, famoxadone, fenamidone, fenitropan, fenpiclonil, fenhexamid, folpet, fluazinam, fluoroimide, propamocarb, propamocarb hydrochloride, propylene glycol fatty acid esters, prohexadione calcium, benzothiazole, benthiavalicarb isopropyl, myclobutanil, organonickel, resveratrol, penthiopyrad, diclomezine, iminoctadine triacetate, tianidil, tiadinil, probenazole, acibenzolar-S-methyl, mandipropamid, pyribencarb, amisulbrom, isotianil, tebufloquin and fluopicolide.
However, the present invention is not limited thereto. The compositions of the present invention can be used in combination of one or more.
Examples of other agents to be mixed more preferably include dinotefuran, thiamethoxam, flusulfamide, simeconazole, penthiopyrad and the like. Synergistic effects can be expected by mixing these other agents. However, the other agents are not limited thereto. The compositions of the present invention can be used in combination of one or more.
Methods of Using the Compositions
The method for controlling plant diseases of the present invention is a method using to the composition containing at least one active selected aminocaproic acid, carbinoxamine maleate, chloroxylenol, chlorpropamide, cinoxacin, duartin, and cyclopentolate hydrochloride as well as their derivatives, or alternate salt/acid forms. The composition is used for controlling at least one disease caused by *Candidatus liberibacter* spp. such as citrus greening and/or potato zebrachip disease or other diseases caused by prokaryotic organisms.

Examples of the method for applying the composition for controlling plant diseases of the present invention include foliar application, seed treatments, seeding box treatment, application along crop row by a transplanter, paddy water application, spraying treatment to soil surface, soil incorporation after spraying treatment to the surface, stem or trunk injection, injection treatment into soil, soil incorporation after injection treatment into soil, soil drench treatment, soil incorporation after soil drench treatment, blow treatment to plant seeds, smear treatment to plant seeds, dip treatment to plant seeds or dust coating treatment to plant seeds and mixing treatment with plant seeds and the like. However, any method can be used as long as they can apply the composition for controlling plant diseases of the present invention. The composition for controlling plant diseases of the present invention usually exerts sufficient efficacy in any application method utilized by those skilled in the art.

Delivery of small molecules into the plant phloem, especially in hardy perennial citrus trees, is a major challenge. The most practical and common approach is foliar spraying; however, this was shown to be relatively ineffective thus additional approaches such as trunk injection and/or nanoparticle-based systems may be used.

When the application method is treatment to soil, application method can be selected from soil drench, soil incorporation and/or treatment to soil surface before planting, at planting or after planting cultivated crops.

Compositions described herein may be introduced via trunk implantation or trunk injection. Injection or implantation of the composition directly into the trunk may aid in delivering the composition to the phloem of the plant. Because of the composition's proximity to the phloem when the composition is injected or implanted into the trunk, disease inhibiting results may be produced faster than via other application methods.

In addition, the application method can be performed according to the application criterion described above. However, specific methods such as the order of treatment, the time to treatment (period), and the number of treatments for the application are not particularly limited as long as they have the effect of controlling the plant diseases. These can be appropriately selected and determined according to the plant diseases to be targeted, plant type, or environment related to other applications.

Furthermore, the compositions with the active components enumerated herein may be combined with a second active agent. These can be diluted with water to be used as a treatment solution. In addition, the composition can be formed as a mixture by combining one or more of the active compositions with a different active ingredient(s) (that is, containing at least one active ingredient) during using the composition. These compositions can be further diluted with water to be used as a spray solution (tank mix method).

An application amount or an application concentration of the composition is not particularly limited as long as the composition for controlling plant diseases has an effect of controlling plant diseases. The application amount and the application concentration can be appropriately selected and be determined based on a target crop, occurrence of harmful organism, formulation of a compound, an application method and various environmental conditions.

When the composition is sprayed, the amount of the active ingredient is usually 10 to 10,000 g per hectare and preferably 25 to 5,000 g per hectare. In addition, when the wettable powder, flowable formulation or the emulsifiable concentrate of the composition is diluted with water and dispersed, a dilution rate thereof is usually 5 to 50,000 times, preferably 10 to 20,000 times, and more preferably 15 to 10,000 times. In addition, when the seed treatment is performed using the composition, the used amount of the composition is usually 0.001 to 50 g, preferably 0.01 to 10 g, per kg of seed.

When the composition is subjected to the foliar application, the spraying treatment to soil surface, the trunk or stem injection, laser ablation with foliar application, injection treatment into soil, the soil drench treatment and the like, the composition is diluted at an appropriate concentration in an appropriate carrier, and then the treatment can be performed. When the composition is brought into contact with plant seeds, the plant seeds may be dipped in the composition as they are. In addition, the composition can be diluted at an appropriate concentration in the appropriate carrier, and then can be dipped, dust-coating, blowed or smeared to plant seeds to be used. The used amount of the composition in the case where the dust-coating, blowing and smearing treatments are performed is usually about 0.05 to 50% and preferably 0.1 to 30% with respect to the weight of the dried plant seed weight. However, the used amount thereof can be appropriately selected and be determined according to the type of plant seeds as the treatment target and the like without being limited to the above range.

Examples of appropriate carriers include liquid carriers of organic solvents such as water and ethanol; and solid carriers of inorganic materials such as bentonite, montmorillonite, kaolinite, diatomaceous earth, kaolin, talc, clay, vermiculite, gypsum, calcium carbonate, amorphous silica, ammonium sulfate; vegetable organic materials such as soybean flour, wood flour, saw dust, wheat flour, lactose, sucrose and glucose; urea; and the like. The carriers are not limited thereto.

The compositions can be used for any plant that may be subject to infection by *Candidatus liberibacter* spp, or by the insects which may harbor or carrier the bacteria, such as the Asian citrus Psyllid or other the Hemipteran insects. Hemipteran insects such as whiteflies, aphids, psyllids, and leafhoppers are devastating pests of crops due to their wide host range, rapid reproduction, and ability to transmit numerous plant-infecting pathogens as vectors. Other plant bacterial pathogens that the methods and compositions disused herein may be used for include other vector-borne bacterial pathogens, such as *Xylella fastidiosa*, *Spiroplasma* spp., *liberibacter* spp., and '*Candidatus phytoplasma* spp' or diseases provided by prokaryotes or other bacterial plant pathogens such as *Clavibacter michiganensis, Pseudomonas syringae, Agrobacterium tumefaciens.*

Specific examples of plants particularly include those from the Solanaceae family such as potato (*Solanum tuberosum* L.), tomato (*S. lycopersicum* L.), pepper (*Capsicum annuum* L.) and tobacco (*Nicotiana tabacum* L.) as well as the *Rutaceae* (*Citrus* spp.). The rue family (*Rutaceae*) comprises more than 2,000 species across 160 genera, most of which are woody shrubs and trees. Many are of the genus *Citrus*, are important food crops, and some are grown as garden ornamentals. Examples include bael fruit, bergamot orange, citrange, citron, grapefruit, lemon, lime, orange, shaddock, tangerine, cork tree, gas plant, hop tree, kumquat, prickly ash, rue, and satinwood.

In theory any plant subject to infection by a bacterial microorganism or by an insect harboring the same may be treated, including but not limited to wheat, barley, maize, grape, apple, pear, peach, sweet cherry, persimmon, citrus, bean, Mexican bean, strawberry, potato, cabbage, Chinese cabbage, lettuce, tomato, cucumber, eggplant, watermelon, beet sugar, spinach, snap pea, pumpkin, sugar cane, tobacco, green pepper, sweet potato, taro, konjac, rape, cotton, sunflower, tulip, chrysanthemum, spring onion, onion, garlic, ginger, grass, and genetically modified plants and the like. The plant is not limited thereto.

The compositions may find use in horticultural crops such as fruit trees, vegetables and flowers. Specific examples of the horticultural crop include grape, apple, pear, peach, sweet cherry, persimmon, citrus and related hybrids, bean, Mexican bean, strawberry, potato, cabbage, Chinese cabbage, lettuce, tomato, cucumber, eggplant, watermelon, spinach, snap pea, pumpkin, sugar cane, tobacco, green pepper, sweet potato, taro, konjac, rape, cotton, sunflower, tulip, *chrysanthemum*, carrot, spring onion, onion, garlic, ginger, and genetically modified plants thereof and the like. The horticultural crops are not limited thereto.

In the present specification, the seed plant means a seed plant that a young plant accumulates nutrients for sprouting and is to be used for agriculture propagation. Specific examples of the seeds of plants include seeds of plants such as maize, bean, cotton, rice, beet sugar, wheat, barley, sunflower, potato, cucumber, eggplant, spinach, snap pea, pumpkin, sugar cane, tobacco and green pepper and rape; seed tubers such as taro, potato, sweet potato and konjac; seed bulbs such as eatable lily, tulip and scallion; plants produced by artificially altering genes such as soybean, maize, cotton which are not originally existed in nature but have herbicide tolerance; rice, tobacco and the like which are adapted to cold region; maize, cotton, carrot, potato and the like to which a herbicidal property production function is applied and the like. The seed plant is not limited thereto.

Plant Diseases

The plant diseases in the present invention mainly refer to diseases caused by phytopathogens, often carried by Hemipteran insects as vectors such as *Candidatus liberibacter* and related species such as *Candidatus liberibacter americanus*, and *Candidatus liberibacter africanus*). *Candidatus liberibacter* are Gram-negative bacteria that live as phloem-limited obligate parasites in plants. These bacteria are transmitted by psyllids, which feed on plant phloem sap. *Citrus* huanglongbing (yellow shoot) or citrus greening disease is associated with *Candidatus liberibacter asiaticus, Candidatus liberibacter africanus*, or *Candidatus liberibacter americanus. Candidatus liberibacter asiaticus* is the most severe pathogen, spread by Asian citrus psyllid *Diaphorina citri* and causing devastating epidemics in several countries. Ca. liberibacter solanacearum is associated with diseases in several solanaceous plants and transmitted by potato psyllid *Bactericera cockerelli*. Zebra chip disease is causing large damage in potato crops in North America. In Europe *Candidatus liberibacter solanacearum* is associated with diseases of the Apiaceae family of plants, carrot and celery, and transmitted by psyllids *Trioza apicalis* and *Bactericera trigonica.*

EXAMPLES

Applicants have previously developed tissue culture methods for growing fastidious pathogens the methods are disclosed in US Published Application 2017/0137776 filed Nov. 16, 2015, the disclosure of which is incorporated by reference. Specifically, since '*Candidatus liberibacter* spp.' (CLso and CLas) are phloem-limited pathogens, the method includes the use of plant hairy roots, which possess intact vasculature, to support their growth.

Hairy roots are functional plant tissues that mimic the pathogen's native host root environment. Hence, we leveraged them to conduct functional screening as a means to identify novel therapies that can inhibit '*Candidatus liberibacter* spp.' Because CLas and CLso are closely related to each other, we focused mainly on CLso hairy root cultures for functional screening due to faster growth of potato hairy roots compared to citrus hairy roots.

We sought to find short- to intermediate-term solutions, and we therefore conducted high-throughput screening of small-molecule inhibitors among a diverse collection of bioactive compounds approved for use in United States and other countries (Microsource Discovery Systems, Inc.). For this, we developed an in vitro multi-well plate assay using the microbial hairy root cultures, which is scalable from 12- to 48- to 96-well layout. Briefly, we generated hairy root cultures, transferred them to a multi-well plate containing growth medium to maintain the hairy root cultures, and then added small molecules of interest to the assay plates and incubated the cultures for 72 h (FIG. 1*a*). We performed a primary screening with ~220 compounds in CLso hairy root cultures, using two biological replicates per compound (10 μM) along with untreated or solvent-alone controls (DMSO, 0.1% v/v). By molecular diagnostics, we identified nine molecules that inhibited CLso titers by >50-70% when compared to the untreated controls (Supplementary Dataset 1). We re-tested these nine molecules using five biological replicates, alongside a reference antibiotic, tetracycline (TC, 250 ppm), that was previously reported to inhibit CLas in planta. We also screened the efficacy of the nine compounds (25 μM) and tetracycline (TC, 500 ppm) in CLas hairy root cultures. Seven out of the nine test compounds, as well as tetracycline, consistently showed statistically significant ($P \leq 0.05$ or 0.01) inhibition of CLso (FIG. 1*b*). Four compounds showed statistically significant ($P \leq 0.05$ or 0.01) inhibition of CLas, on par with tetracycline (FIG. 1*c*). Three compounds inhibited both CLso and CLas (#3, #8 and #9) (FIGS. 1*b, c*). In general, the active compounds appear to possess diverse structures and bioactive profiles (FIG. 1-*m*): three of them were indexed as antibacterial, whereas others were classified as antifungal, antiprotozoal, hemostatic, antihistaminic, antidiabetic and mydriactic drugs targeting various biological processes. Note that since the re-tested nine molecules were originally pre-screened in CLso cultures (Supplementary Dataset 1), it is very likely that further re-screening of the entire library using CLas hairy root cultures would identify additional hits.

Delivery of small molecules into the plant phloem, especially in hardy perennial citrus trees, is a major challenge. The most practical and common approach is foliar spraying; however, this was shown to be relatively ineffective in citrus as a means to deliver bactericides such as oxytetracycline to inhibit CLas. Multiple research groups are evaluating alternative approaches, such as trunk injection, laser ablation and/or nanoparticle-based systems. Potato plants are relatively easier to handle and are amenable to foliar spraying techniques. Thus, to determine the in-planta efficacy of the three new molecules that showed good inhibitory activity against both CLso and CLas (#3, #8 and #9) in the hairy root assays (FIG. 1), we used the CLso-potato plant system. First, we repeated efficacy assays in CLso-potato microbial hairy root cultures, testing a broader range of concentrations (0, 5, 10, 25 and 50 μM) (FIG. 2) to establish a general dose-response curve. Based on these results, 10 and 25 μM concentrations were chosen for in planta foliar spraying experiments. Plants were sprayed with each compound twice a week, alongside untreated plants and tetracycline (250 ppm)-treated plants as negative and positive controls, respectively. Disease progression was monitored for 28 days post-infection (dpi), by which time untreated plants showed the typical foliar disease symptoms such as chlorosis, necrosis, leaf curling and wilting, and were quite close to dying (FIG. 2). In contrast, potatoes sprayed with any of the three test molecules showed a clearly lower level of disease symptoms that was also dose-dependent, i.e., plants sprayed with 25 μM showed the least symptoms, followed by those sprayed with 10 μM and untreated plants, and the level of protection was on par with that from tetracycline treatment (FIG. 2*a*). The attenuated symptoms also correlated with lowered CLso titers in the respective treatment groups when compared to untreated controls (FIG. 2*b*). Together, these experiments demonstrate that the newly identified compounds can inhibit '*Candidatus liberibacter* spp.' in planta, and the efficacy results conform with the results of the hairy root bioassays.

A recent consensus study by the US National Academy of Sciences (NAS) on the status of the citrus greening research and development concluded that there is no single effective therapy to fight the disease. This holds true not only for citrus greening, but also for other insect-vectored diseases caused by *Candidatus liberibacter* spp. The NAS report also suggested deployment of a combination of therapies and management practices to combat the disease. However, a major challenge in finding new therapies has been the unculturable nature of '*Candidatus liberibacter* spp.', which makes conventional gene- or chemical-therapy evaluation are laborious and time-consuming. For instance, evaluating the efficacy of an antimicrobial peptide using either stable transformation or transient viral vectors (e.g., tobacco rattle virus and citrus tristeza virus) followed by disease challenges in mature plants could take from 6 months to several years. Similarly, screening of small-molecule inhibitors or active ingredients by foliar spraying, by stem injection or by grafting using mature plants is inherently variable due to the challenges associated with delivery of the inhibitors to the bacteria that reside unevenly within the plant vasculature. Furthermore, the latter approaches are laborious and time-consuming, and hence not suitable for high-throughput studies. Researchers have also resorted to using distantly related microbes as surrogates. However, these results may or may not be reliable or extrapolatable to the target pathogen, owing to differences in pathosystems and virulence mechanisms (or lack thereof).

In a manner similar to the classical culture strategies for mammalian viruses in host cells, tissues and embryonated eggs, our experiments demonstrate that plant hairy roots can be used for ex vivo culture and propagation of fastidious pathogens like '*Candidatus liberibacter* spp.' As short-term therapies, we identified eight new bioactive compounds that are quite diverse in their chemical structures and modes of action (FIG. 1). All these, either individually or in combinations, could be further deployed in the host plants to develop robust resistance against these phytopathogens.

Another advantage of using the microbial hairy root system is that the screening can be accomplished four to six times faster than with conventional approaches. For instance, small molecules or peptides can be screened using in vitro hairy root assays in ~72 h (FIG. 1), vs. several weeks to months when using conventional in planta approaches (FIG. 2).

Plant, Insect Maintenance, and Disease Challenges Potato (*Solanum tuberosum* L. var. Atlantic) and tomato (*Solanum lycopersicum* L. var. Lance) plants were propagated in professional growth mix (Metro-Mix 360, Sun Gro Horticulture, MA) and maintained in a growth chamber at 21-22° C., with a 14-h/10-h light/dark photoperiod and 50% relative humidity. *Bactericera cockerelli* (Šulc) psyllid colonies that were either CLso positive (haplotype B, the most virulent and prevalent haplotype) or CLso negative were collected in Texas, USA36, and maintained in nylon mesh cages (Bugdorm, Taiwan) in the laboratory. The presence and haplotype of CLso in the psyllid colonies were periodically confirmed using PCR, with primers specific to the single sequence repeat (SSR) loci of CLso. To generate CLso-infected plants, 1-month-old potato and tomato plants were challenged with ~20 psyllids harboring CLso. The psyllids were released onto the plants in an enclosed organza bag tied to a lower branch with fully expanded leaves and were allowed to feed for 1 week. Subsequently, the bags and psyllids were removed from the plant, and the unchallenged upper branches were sampled periodically using PCR, as described below, to confirm the systemic spread of CLso in the plants, which typically could be detected at around 14 days post-challenge.

Microbial Hairy Root Culture Production

Both ex vivo and in planta approaches were evaluated to generate potato and tomato hairy root cultures using CLso-infected plants as an inoculum. In the ex vivo approach, branches were excised from either healthy (unchallenged control) or CLso-infected plants 21 days post challenge and then inoculated with a fresh culture of *Rhizobium rhizogenes* (American Type Culture Collection strain 15834 or 43056; OD:0.5), as described previously Crane, C., Wright, E., Dixon, R. A. & Wang, Z.-Y. Transgenic *Medicago truncatula* plants obtained from *Agrobacterium tumefaciens*-transformed roots and *Agrobacterium rhizogenes*-transformed hairy roots. Planta 223, 1344-1354 (2006);

Alagarsamy, K., Shamala, L. F. & Wei, S. Protocol: high-efficiency in-planta *Agrobacterium*-mediated transgenic hairy root induction of *Camellia sinensis* var. *sinensis*. Plant methods 14, 17 (2018); Khandual, S. & Reddy, P. M. Rapid, efficient and high-performance protocol for *Agrobacterium rhizogenes*-mediated hairy root transformation of the common bean *Phaseolus vulgaris*. Advances in Bioscience and Biotechnology 5, 333 (2014).

In the in-planta approach, *R. rhizogenes* (OD600=0.5) was directly inoculated into the stems of live plants using a syringe, after which the stems were wrapped with foil to maintain humidity and placed in a growth chamber. To generate the CLas hairy roots, CLas-positive branches, confirmed using PCR, were collected from either HLB-graft-infected or naturally infected citrus trees (Rio Red grapefruit [*C. paradisi* Macfd] or sour orange [*C. aurantium* L.]) maintained in the research plots of Texas A&M University Kingsville Citrus Center, Weslaco, TX, USA (26° 10'00.1"N 97° 57'27.7"W). Uninfected citrus materials were collected from glasshouse-grown trees with no exposure to the Asian citrus psyllid (*Diaphorina citri*) and were screened by PCR to confirm the absence of CLas. The uninfected and CLas-infected citrus materials were inoculated using ex vivo approaches described previously. All explants were maintained at high humidity, which is essential for hairy root recovery and tissue viability. Newly formed hairy roots were monitored regularly and confirmed using GFP visualization with fluorescence microscopy (Olympus Corporation, Japan). The hairy root transformation efficiency was calculated using the following formula: number of GFP-positive roots/total number of roots×100. The transformation of the hairy roots was further confirmed using PCR amplification of either the GFP or rolB/rolC genes encoded on the binary and Ri T-DNA plasmids, respectively, which were transformed into the hairy root cultures. The Solanaceae RPL2 and citrus GAPC2 endogenous genes were used as the PCR controls. The presence and estimated titers of CLso in the infected hairy root cultures were assessed by amplification of CLso 16s rDNA using specific primers (OA2-F/OI2c-R and Lso-F/HLB-R)35,36, whereas CLas was estimated using specific markers for genes encoding ribosomal protein (rp1A, A2-F/J5-R) and ribonucleotide reductase β-subunit gene (nrdB, RNR-F/RNR-R). Sanger sequencing and BLAST analysis further confirmed the identity of CLso and CLas PCR amplicons. The temporal growth patterns of CLso and CLas in the hairy roots were assessed by determining the titers at various days after hairy root culture initiation (dpi). CLso samples were collected at 0, 7, 14, 21 and 28 dpi, whereas CLas samples were collected at 0, 30, 90, 120 and 180 dpi. To estimate the copy number, we generated standard curves for CLso and CLas and used the regression equation to determine the genome equivalents.

Antimicrobial Assays Using Microbial Hairy Roots

High-throughput screening of small molecules was performed using ~220 compounds from the Spectrum bioactives collection (Microsource Discovery Systems, Inc., CT, USA). Primary screening was performed with two biological replicates of each compound (10 μM), along with untreated and solvent-alone negative controls (DMSO, 0.1% v/v). Briefly, ~200 mg of the CLso hairy root cultures was surface sterilized with 2% bleach and then washed five times with sterile distilled water. The hairy roots were transferred into multi-well plates containing Gamborg's B-5 medium with 1% sucrose. The compounds were then added to the plate, and the medium was vacuum infiltrated at ~200 kPa to facilitate the penetration of the molecules into the hairy root matrices. The cultures were incubated on an end-on shaker at 60 rpm in the dark at 21° C. for 72 h. The hairy root tissues were sampled after 72 h, flash-frozen in liquid nitrogen and stored at −80° C. in preparation for further processing. The most effective compounds identified in the primary screening were re-tested at both at 10 and 25 μM, using five biological replicates each, in both CLso and CLas hairy root cultures, respectively, along with tetracycline as a positive control. The structures of the different chemical compounds were determined using ChemSpider (chemspider.com).

In Planta Efficacy Trials

Three-week-old potato (var. Atlantic) plants were challenged with CLso-containing to psyllids. Briefly, five psyllids carrying CLso were restricted to the lowest branch of the plant and contained using an organza drawstring bag tied around the branch. After 1 week, the bags containing psyllids were clipped off the plant to prevent the escape of the newly emerging psyllids and/or nymphs. All the challenged plants were treated with either 0 (untreated), 10 or 25 μM of the selected compounds and tetracycline (250 ppm) twice a week for up to 4 weeks. To enhance penetration into leaf tissues, all the compounds were mixed with R-11 non-ionic surfactant, which improves the activity and efficacy of the spray application by reducing surface tension and increasing penetration into the plant surface. Four biological replicate plants were included for each treatment. The visual disease symptoms on the plants were monitored weekly, and tissue samples were collected (as described above) at 28 dpi for molecular diagnostics as described below.

To determine the effects of small molecules on the CLso and CLas titers within the hairy root cultures and plants, qPCR analysis was performed using DNA isolated from the various samples. DNA was isolated from ~200 mg of tissue homogenized using a Precellys 24 homogenizer (MO BIO Laboratories, Carlsbad, CA, USA), as described previously. The quality and quantity of DNA were determined using a NanoDrop 1000 Spectrophotometer (Thermo Fisher Scientific) and agarose gel electrophoresis. Approximately 50 ng total DNA was used for the qPCR analysis, which was performed on a CFX384™ Real-Time PCR Detection System (Bio-Rad Laboratories) using iTaq™ universal SYBR® Green supermix (Bio-Rad Laboratories), following the manufacturer's instructions. The CLso 16S rDNA-specific primers (OA2-F/OI2c-R and Lso-F/HLB-R) were used to detect CLso, whereas primers for the CLas genes encoding ribosomal protein (rp1A, A2-F/J5-R) and ribonucleotide reductase β-subunit (nrdB, RNR-F/RNR-R) were used to detect CLas. A dissociation or melting curve analysis was performed to confirm the lack of nonspecific amplification and primer-dimers. For the antimicrobial treatments, the relative CLso titers were estimated using the 2-ΔΔCt method. The CLso Ct values were normalized to RPL2 to correct for concentration differences in the DNA templates among the samples and were plotted relative to the level in the control (DMSO-treated) CLso hairy root samples, which was set to 100%. Student's t-test was used to determine statistically significant (P≤0.05 or 0.01) differences among the controls and treatments.

Figure 3A:
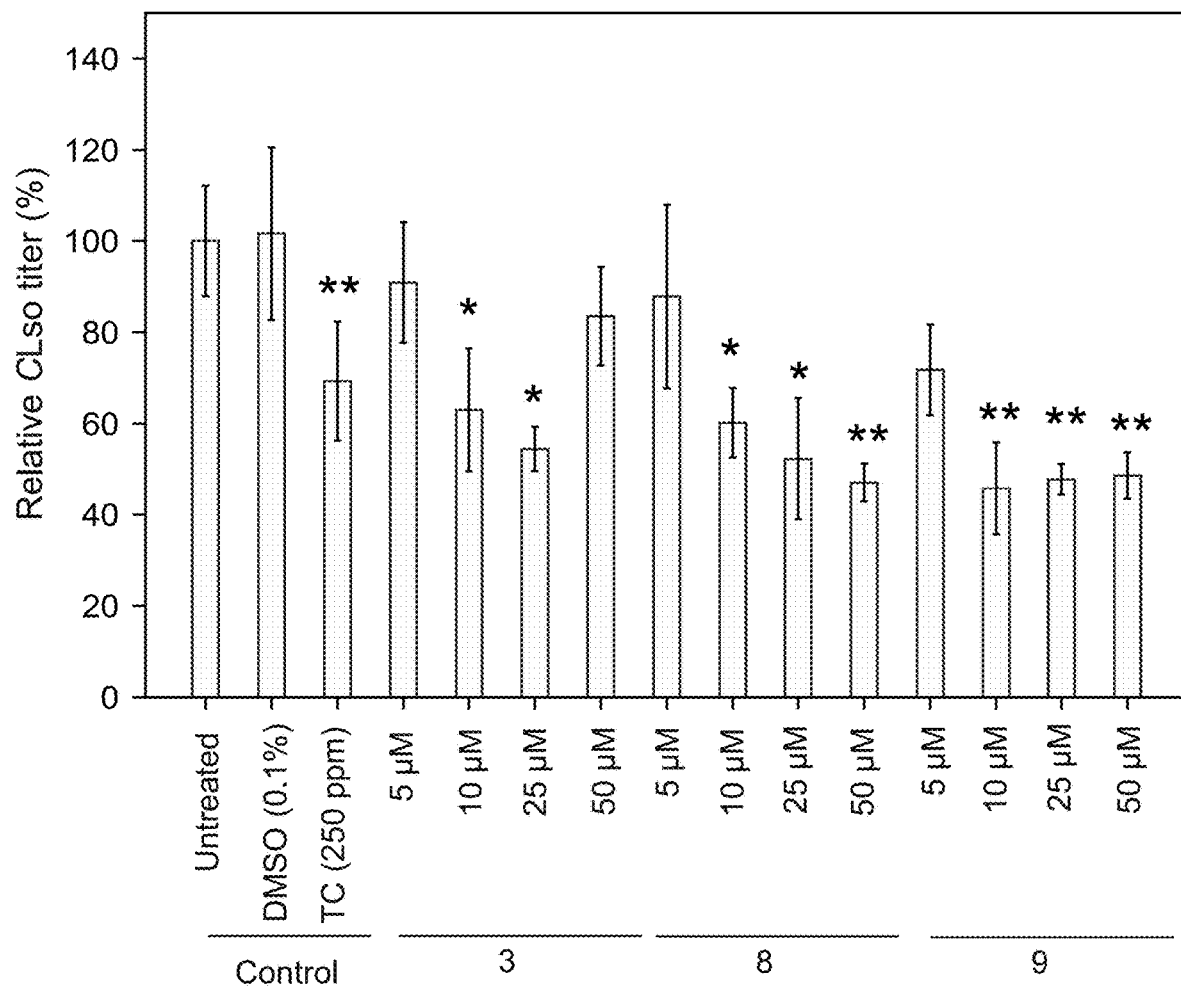
Figure 3B:
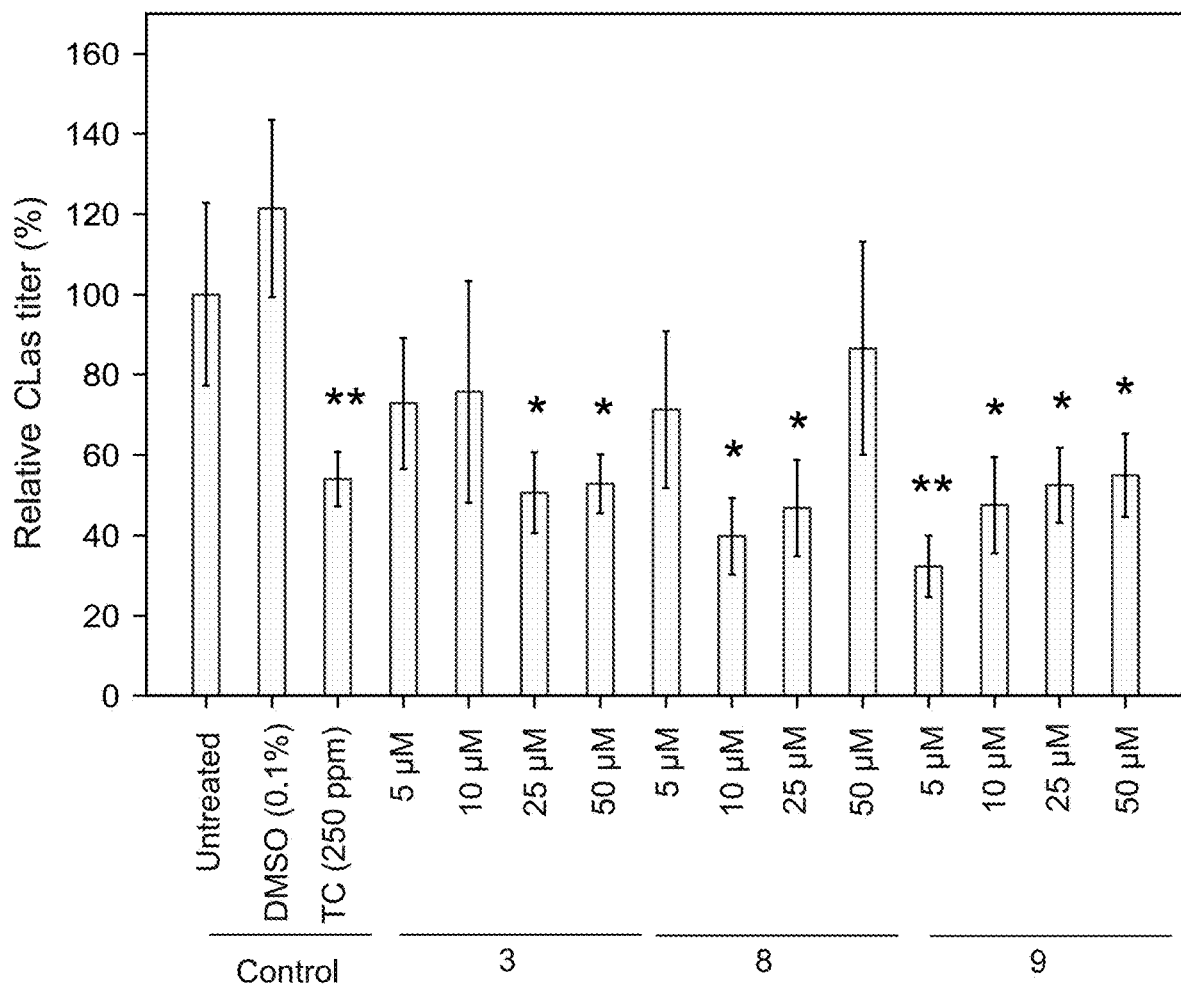
Figure 4:
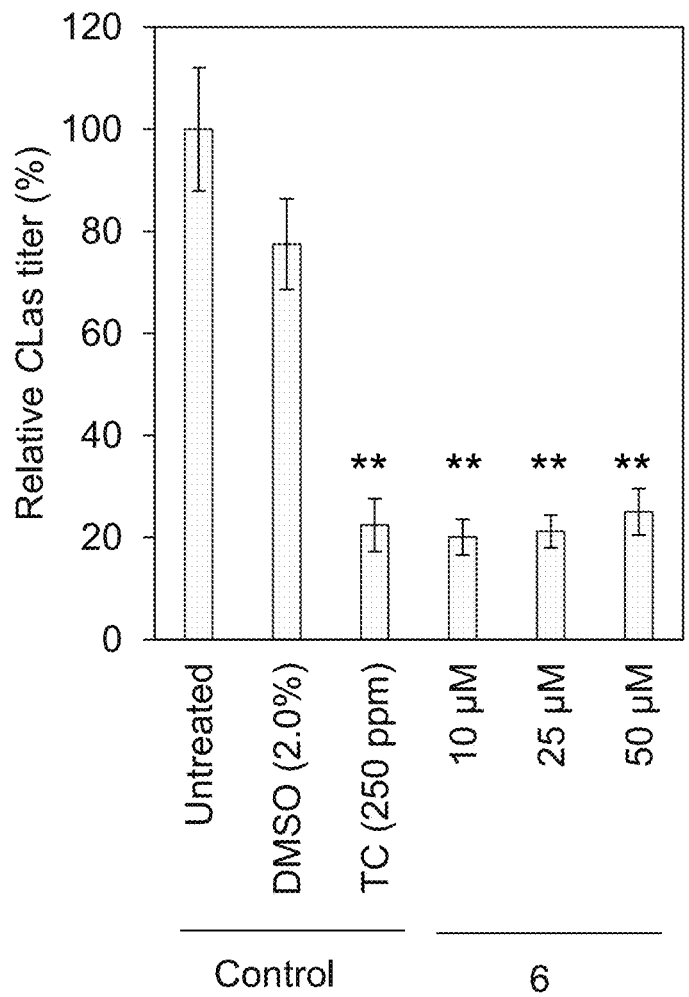

Finally, Dose-response inhibition assays of three selected compounds in CLso-potato and CLas-citrus hairy root cultures was determined (See FIG. 3). Dose-response inhibition assays of three selected compounds in CLso-potato and CLas-citrus hairy root cultures. Relative CLas (a) and CLso (b) titers were calculated from five biological replicates. Untreated, DMSO (0.1%) and tetracycline (TC, 250 ppm) were used as negative and positive controls. Error bars represent standard error. *, , Student's t-test P≤0.05 and 0.01, respectively. In FIG. 4 several additional phytobacteria were tested. The respective bacterial cultures were grown in the presence of multiple concentrations of a compound (μM) for 24 h, followed by cell density measurements (OD: 600). Compounds that inhibited bacterial growth significantly are indicated by asterisks (N=4, highly effective,  P≤0.001; effective, * P≤0.05; and not effective, NS P>0.05).

These compounds were also tested against other phytobacteria. The results are shown in Table 3 below. The respective bacterial cultures were grown in the presence of multiple concentrations of a compound (μM) for 24 h, followed by cell density measurements (OD: 600). Compounds that inhibited bacterial growth significantly are indicated by asterisks (N=4, highly effective, ** P≤0.001; effective, * P≤0.05; and not effective, NS P>0.05). The respective bacterial cultures were grown in the presence of multiple concentrations of a compound (μM) for 24 h, followed by cell density measurements (OD: 600). Compounds that inhibited bacterial growth significantly when compared to untreated (0 μM) are indicated by asterisks (highly effective, ** P≤0.001; effective, * P≤0.05; and not significantly effective, NS P>0.05; N=4).

According to the results, Chloroxylenol, Chlorpropamide, and were shown to be effective against the gram-positive plant phytobacteria *Clavibacter michiganensis* (responsible for canker disease, ring rot and other xylem assaults). All were shown to be effective albeit at various concentrations against the gram-negative bacteria *Pseudomonas syringae* (responsible for necrosis of stems and leaves of plants). Finally chloroxylenol, Chlorpropamide, and Cinoxacin were shown to be effective against the gram-negative bacterial *Agrobacterium tumefaciens* (responsible for crawn gall disease).

TABLE 3

Efficacy of the new chemicals against other phytobacteria.

| | *Clavibacter michiganensis* (Gram positive) | | | | | *Pseudomonas syringae* (Gram negative) | | | | | *Agrobacterium tumefaciens* (Gram negative) | | | | |
|---|---|---|---|---|---|---|---|---|---|---|---|---|---|---|---|
| Dosage (μM) | 0 | 5 | 10 | 20 | 50 | 0 | 5 | 10 | 20 | 50 | 0 | 5 | 10 | 20 | 50 |
| Aminocaproic acid hydrochloride | 1.61 | 1.64 | 1.64 | 1.66 | 1.59 | 1.82 | 1.80 | 1.81 | 1.80 | 1.78* | 1.12 | 1.17 | 1.16 | 1.10 | 1.11 |
| Carbinoxamine maleate | 1.61 | 1.68 | 1.63 | 1.58 | 1.59 | 1.82 | 1.81 | 1.81 | 1.81 | 1.77* | 1.12 | 1.10 | 1.08 | 1.14 | 1.20 |
| Chloroxylenol | 1.61 | 1.59 | 1.56 | 1.52 | 1.38** | 1.82 | 1.82 | 1.81 | 1.76** | 1.30** | 1.12 | 1.12 | 1.06 | 0.99 | 0.92* |
| Chlorpropamide | 1.61 | 1.67 | 1.65 | 1.63 | 1.56 | 1.82 | 1.77** | 1.78* | 1.76** | 1.77* | 1.12 | 1.14 | 1.14 | 1.17 | 1.16 |
| Cinoxacin | 1.61 | 1.63 | 1.64 | 1.59 | 1.57 | 1.82 | 1.77* | 1.76* | 1.72** | 1.76** | 1.12 | 1.17 | 1.11 | 1.13 | 0.94* |
| Duartin (−) | 1.61 | 1.66 | 1.61 | 1.65 | 1.62 | 1.82 | 1.77** | 1.78** | 1.79 | 1.76** | 1.12 | 1.10 | 1.11 | 1.10 | 1.09 |
| Cyclopentolate hydrochloride | 1.61 | 1.64 | 1.60 | 1.59 | 1.62 | 1.82 | 1.78* | 1.79 | 1.77* | 1.73** | 1.12 | 1.08 | 1.11 | 1.11 | 1.12 |

TABLE 1

Details of the new chemicals.

| Chemical Name | Inhibitory Activity* | CAS Number | Formula | Mol, Wt. | Bioactivity | Source | Trade name | References |
|---|---|---|---|---|---|---|---|---|
| Aminocaproic acid hydrochloride | CLso | 4321-58-8 | C6H14ClNO2 | 167.63 698 | hemostatic | synthetic | AMICAR | Br Med J 4:17 (1975); J Surg Oncology 33:109 (1986); |

TABLE 1-continued

Details of the new chemicals.

| Chemical Name | Inhibitory Activity* | CAS Number | Formula | Mol. Wt. | Bioactivity | Source | Trade name | References |
|---|---|---|---|---|---|---|---|---|
| Carbinoxamine maleate | CLso | 3505-38-2, 486-16-8 [carbinoxamine] | C20H23ClN2O5 | 406.86 971 | Antihistaminic | synthetic | CLISTIN | J Thorac Cardiovasc Surg 95:538 (1988); Circulation 99:81 (1999) Ann Pharm Fr 20:463 (1962) |
| Chloroxylenol | CLso and CLas | 88-04-0 | C8H9ClO | 156.61 333 | antibacterial, topical and urinary antiseptic | synthetic | DETTOL | J. Hosp. Infect. (1998), 38(4), 283-95; Am. J. Infect. Control (1988), 16(4), 173-7; Infect. Control (1986), 7(5), 268-72 |
| Chlorpropamide | CLso | 94-20-2 | C10H13ClN2O3S | 276.74 371 | antidiabetic | synthetic | DIABINESE | Indian J Med Res 55:1084 (1967); Toxicol Appl Pharmacol 18:185 (1971) |
| Cinoxacin | CLas | 28657-80-9 | C12H10N2O5 | 262.22 39 | antibacterial | synthetic; 64716 | CINOBAC | Pharmacotherapy 2:266 (1982); Drugs 25:544 (1983) |
| Duartin (−) | CLso and CLas | 52305-04-1 | C18H20O6 | 332.35 65 | Antiprotozoal | *Dalbergia variabilis, Machaerium opacum* | | Phytochemistry 17:1401 (1978); J Pharm Pharmacol 46:118 (1994); Planta Med 62:98 (1996) |
| Cyclopentolate hydrochloride | CLso and CLas | 5870-29-1, 512-15-2 [cyclopentolate] | C17H26ClNO3 | 327.85 467 | mydriatic | synthetic | ALPENTOLATE | Neuropharmacology (1977), 16(12), 833-9; J. Pharmacol. Exp. Ther. (1958), 123, 230-7; Actaophthalmol. (1976), 54(4), 456-72 |

*CLso: *Candidatus Liberibacter solanacearum*; CLas: *Candidatus Liberibacter asiaticus*

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention as described in the appended claims.

What is claimed is:

1. A formulated composition effective in controlling plant phytopathogens and resultant diseases caused in a plant thereby comprising:
   duartin;
   a plant active of a miticide, nematicide, herbicide, a plant growth regulator, microbial agricultural chemical, soil conditioner and/or fertilizer; and
   an environmentally acceptable carrier.

2. The composition of claim 1 further comprising a surfactant, a wetting agent, an adhesive agent, a thickener, an antimicrobial antifungal agent, a coloring agent, or a stabilizer.

3. The composition of claim 1 wherein said composition is in the form of granules, wettable powders, flowable formulation, granulated wettable powders, dust, or emulsifiable concentrates.

4. The composition of claim 1 wherein said plant phytopathogen is a bacterial plant pathogen.

5. The composition of claim 4 wherein said bacterial pathogen is *Xylella fastidiosa, Spiroplasma* spp., *liberibacter* spp., *Clavibacter michigane, Pseudomonas syringae, Agrobacterium tumefaciens* or *Candidatus phytoplasma* spp.

6. The composition of claim 5 wherein said bacterial pathogen is *liberibacter* spp.

7. The composition of claim 6 wherein said pathogen is *Candidatus liberibacter solanacearum, Candidatus liberibacter asiaticus, Candidatus liberibacter africanus*, and/or *Candidatus liberibacter americanus*.

8. The composition of claim 4 wherein said bacterial plant pathogen is carried by a hemipteran pest vector.

9. The composition of claim 1 wherein said composition inhibits *Candidatus liberibacter solanacearum* and/or *Candidatus liberibacter asiaticus*.

10. The composition of claim 1 wherein said plant disease is Potato Zebrachip disease and/or Citrus greening disease.

11. The composition of claim 1 wherein said plant is potato (*Solanum tuberosum* L.), tomato (*S. lycopersicum* L.), pepper (*Capsicum annuum* L.) and/or tobacco (*Nicotiana tabacum* L.).

12. The composition of claim 1 wherein said plant is a Rutaceae plant.

13. The composition of claim 1, wherein the plant active further comprise imidacloprid.

14. A method of treating or preventing growth of bacterial pathogens on a plant comprising:

administering to a plant, plant part, or the area surrounding the same a composition comprising at least one active duartin and an environmentally acceptable carrier.

15. The method of claim 14 wherein said administering is by foliar application.

16. The method of claim 14 wherein said administering is by trunk injection, laser ablation and/or spraying.

17. The method of claim 14 wherein said administering is at a concentration of about 5 to about 50 μM.

18. The method of claim 14 wherein said spraying is twice a week.

19. The method of claim 14 wherein said administering is by coating plant seeds.

20. The method of claim 19 wherein said coating is by dipping, dust-coating, blowing or smearing to plant seeds to be used.

21. The method of claim 14 wherein said bacterial pathogens is one or more of *Xylella fastidiosa, Spiroplasma* spp., *liberibacter* spp., *Clavibacter* michigane, *Pseudomonas syringae, Agrobacterium tumefaciens* or *Candidatus phytoplasma* spp.

22. The method of claim 21 wherein said bacterial pathogen is *liberibacter* spp.

23. The method of any claim 22 wherein said bacterial pathogen is *Candidatus liberibacter solanacearum* and/or *Candidatus liberibacter asiaticus.*

24. The method of claim 23 wherein said at least one active includes chloroxylenol, duartin or and cyclopentolate hydrochloride.

25. The method of claim 14 wherein said bacterial pathogens comprise is Potato Zebrachip and/or Citrus greening disease.

26. The method of claim 14 wherein said plant is potato (*Solanum tuberosum* L.), tomato (*S. lycopersicum* L.), pepper (*Capsicum annuum* L.) and/or tobacco (*Nicotiana tabacum* L.).

27. The method of claim 26 wherein said plant is a Rutaceae plant.

28. The method of claim 27 wherein said plant is a bael fruit, bergamot orange, citrange, citron, grapefruit, lemon, lime, orange, shaddock, tangerine, cork tree, gas plant, hop tree, kumquat, prickly ash, rue, citrus hybrid, or satinwood.

29. The method of claim 14 wherein bacterial titers are reduced by about 50-70% when compared to the untreated controls.

30. The method of claim 14 method further comprising the step of: combining said active with a plant active agent of a miticide, nematicide, fungicide, herbicide, a plant growth regulator, microbial agricultural chemical, soil conditioner and/or fertilizer.

31. A method of treating soil to reduce hemipteran delivered bacterial infections in plant populations therein comprising:

administering to said soil a composition including at least one active duartin and an environmentally acceptable carrier.

32. The method according to claim 31, wherein the administering comprises a soil drench, mixing with soil and/or treating a soil surface before planting, at planting or after planting.

33. The method of claim 32 wherein said administering is by spraying on a soil surface.

* * * * *

UNITED STATES PATENT AND TRADEMARK OFFICE
CERTIFICATE OF CORRECTION

PATENT NO. : 12,121,028 B2
APPLICATION NO. : 17/303367
DATED : October 22, 2024
INVENTOR(S) : Mandadi et al.

Page 1 of 1

It is certified that error appears in the above-identified patent and that said Letters Patent is hereby corrected as shown below:

In the Claims

In Claim 18, at Column 25, Line 27:
DELETE: "14"
INSERT: --16--

In Claim 20, at Column 25, Lines 32-33:
DELETE: "to be used"

In Claim 24, at Column 26, Line 5:
DELETE: "duratin or and"
INSERT: --and/or--

Signed and Sealed this
Fourth Day of February, 2025

Coke Morgan Stewart
*Acting Director of the United States Patent and Trademark Office*